INVENTOR
Fritz Jakob
By Toulmin & Toulmin
ATTORNEYS

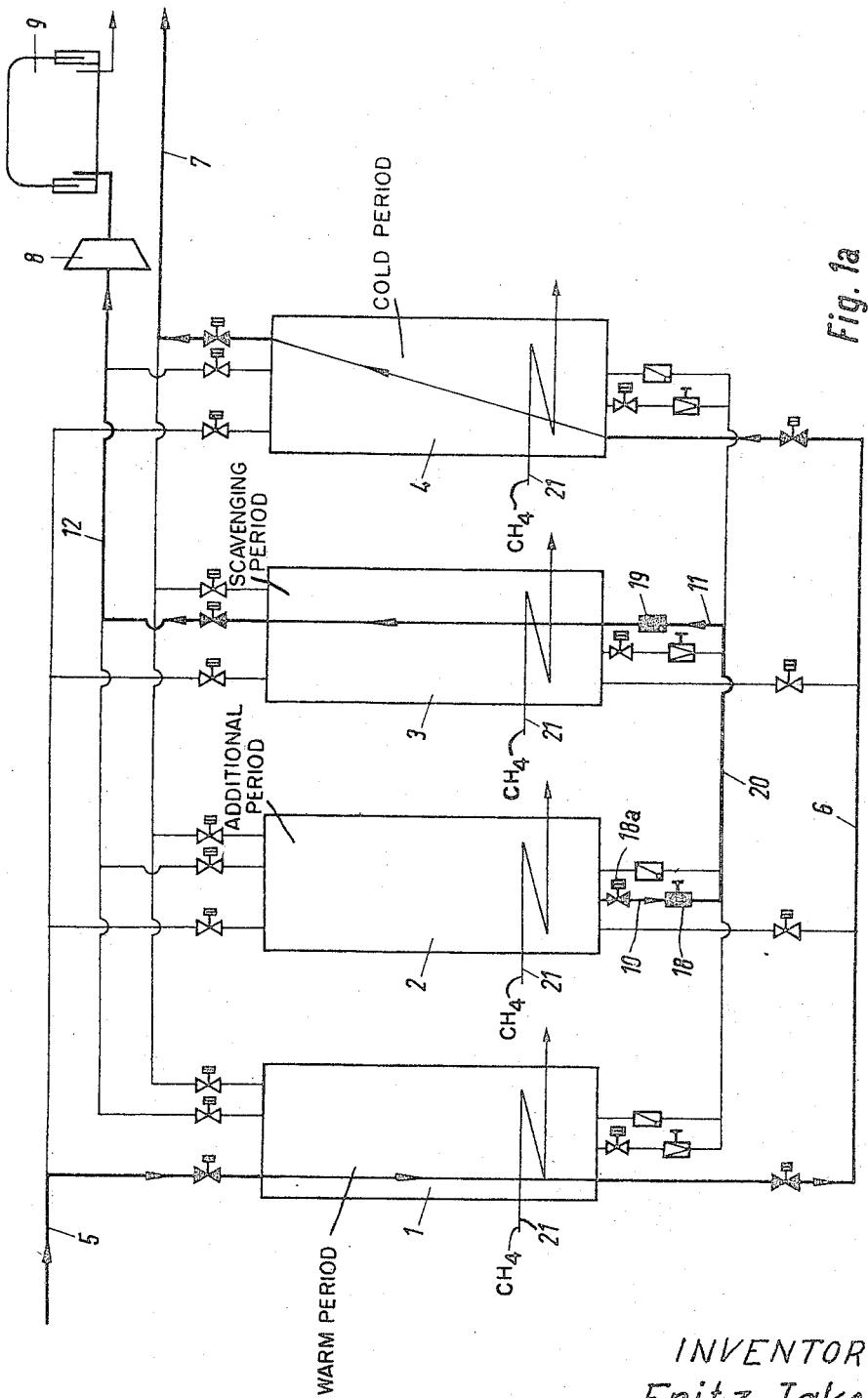

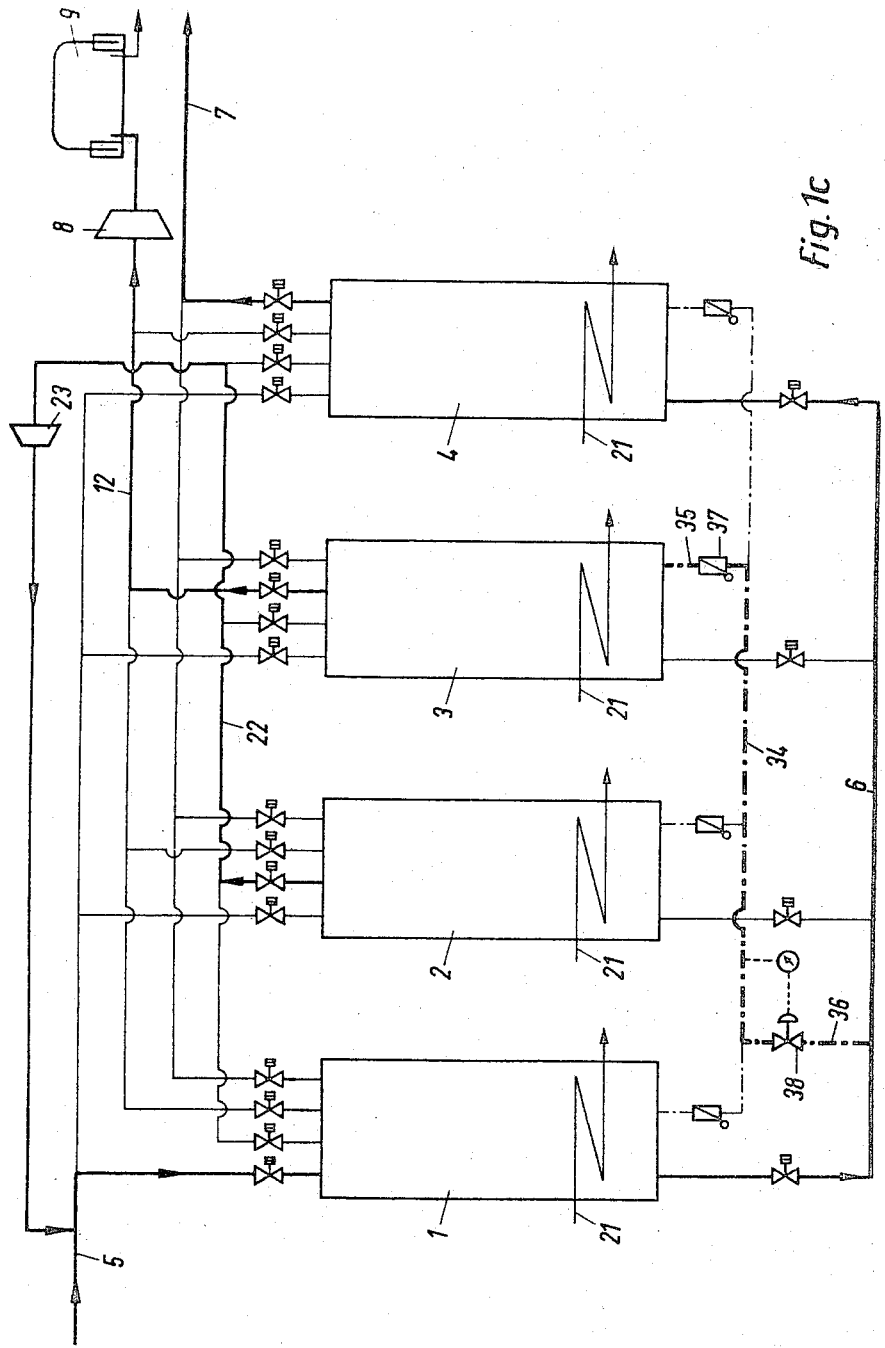

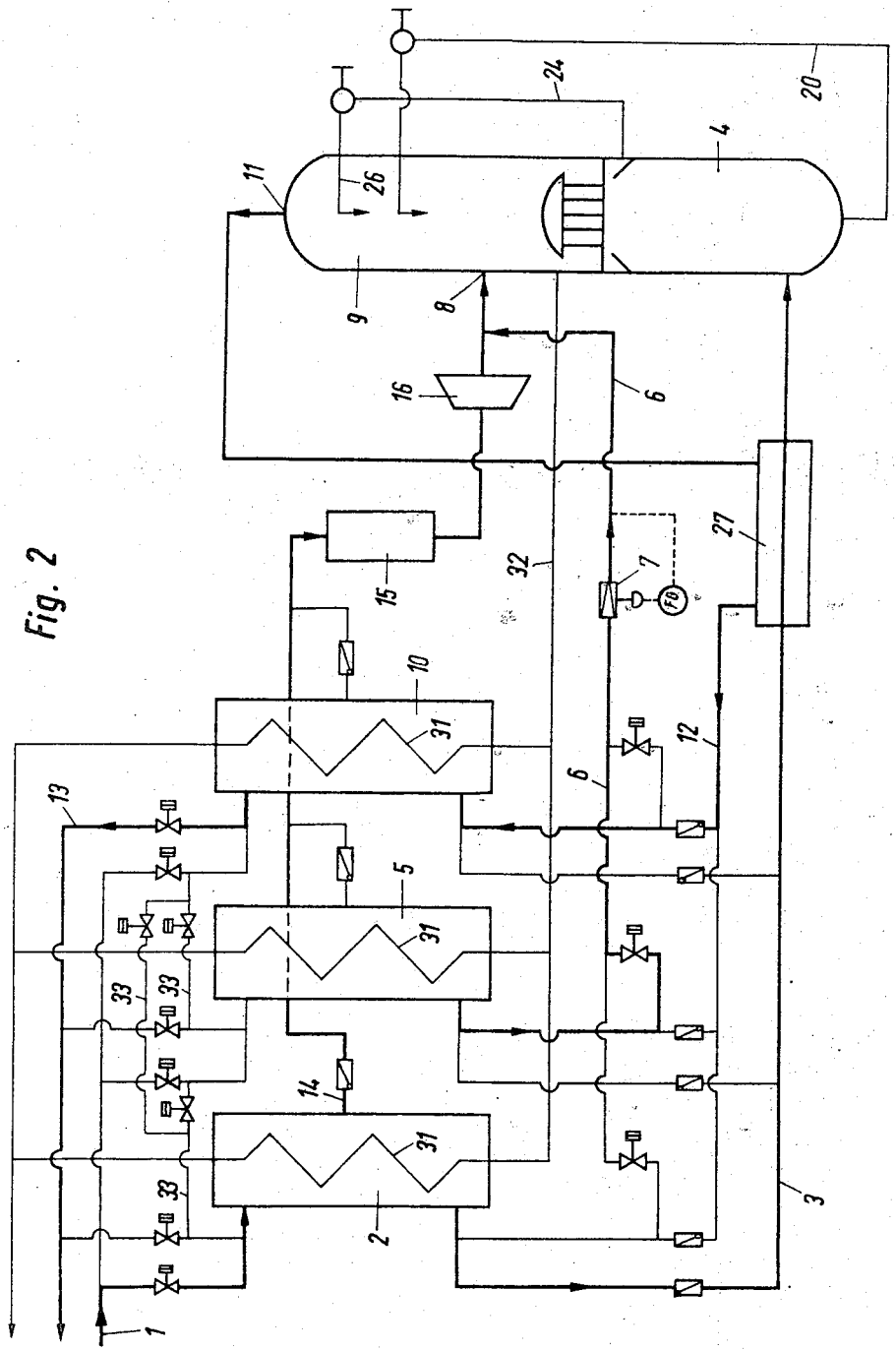

United States Patent Office 3,375,672
Patented Apr. 2, 1968

3,375,672
PROCESS FOR HEAT EXCHANGE AND CLEANSING OF GASES IN PERIODICALLY REVERSIBLE REGENERATORS
Fritz Jakob, Achmuhle, Germany, assignor to Linde Aktiengesellschaft, Wiesbaden, Germany
Filed Aug. 14, 1964, Ser. No. 389,710
Claims priority, application Germany, Aug. 21, 1963, G 38,517
11 Claims. (Cl. 62—13)

ABSTRACT OF THE DISCLOSURE

In a low temperature gas separation process wherein a set of interchangeable regenerators are employed, the process usually comprising a first period for cooling and cleaning high pressure gas, a second period for scavenging impurities deposited in the first period, and a third period for warming gaseous products while at the same time cooling the regenerator so that it can be employed in the first period again, the improvement comprising an additional period immediately after the first period wherein residual high pressure gas left in the regenerator is withdrawn and reused in the process, for example, as a scavenging gas, or as a recycle to the raw gas, this withdrawn gas from the additional period being normally of no use in conventional processes.

---

Figure 1B:
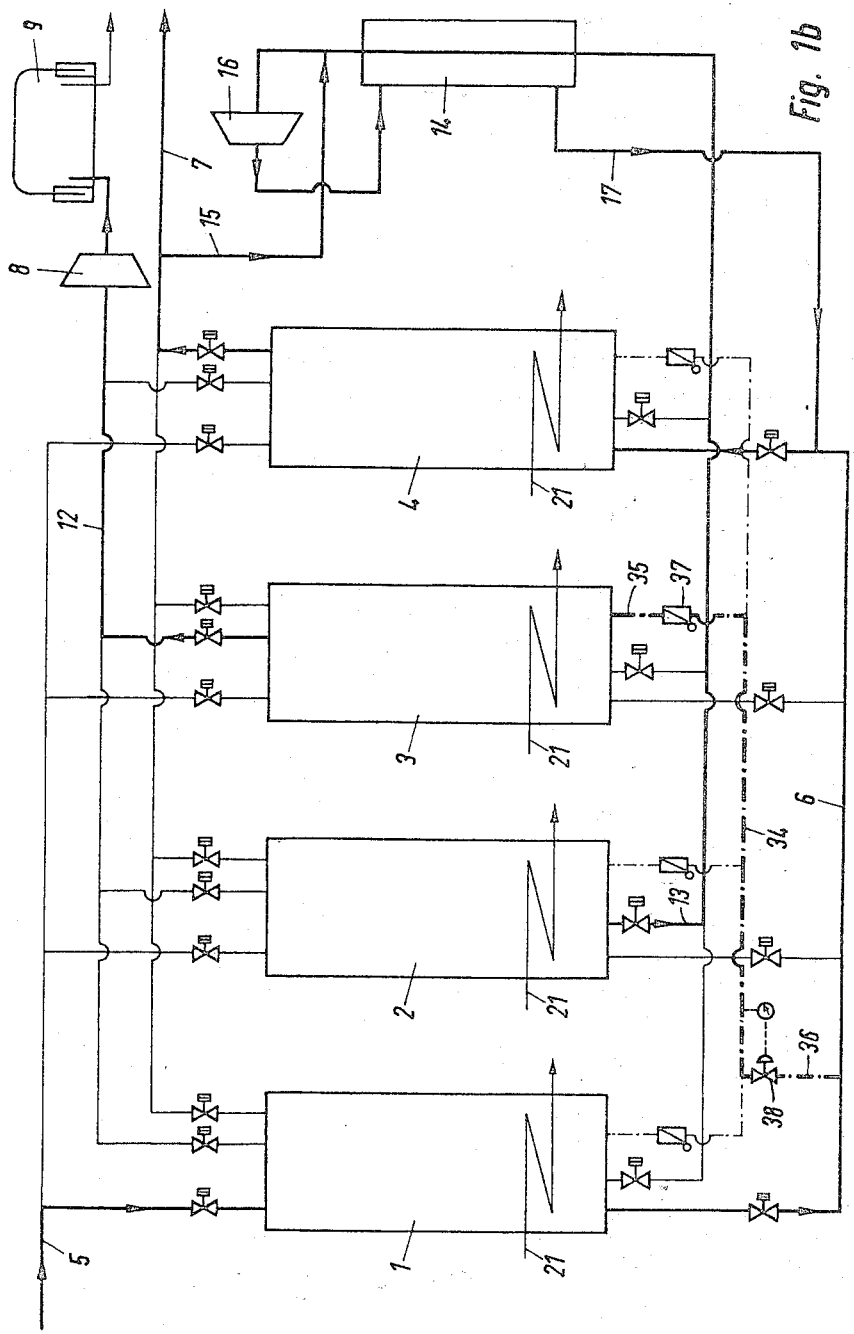

The present invention relates to a process and apparatus for heat exchange and heat exchange and cleansing of gases in periodically reversible regenerators. More particularly, it relates to a process and apparatus for heat exchange and heat exchange and cleansing of gases in periodically reversible regenerators operated alternately at a higher pressure and subsequently at a lower pressure.

Efficient heat exchange constitutes an important economic factor in the operation of most gaseous phase operations and many efforts have been made to increase the efficiency of such operations. The present invention provides for an important and economical improvement in the efficiency of gaseous phase heat exchange operations, and involves the use of regenerators which can be operated at different pressures.

Regenerators are containers with heat storage masses of large surface area, one regenerator at a time being traversed and warmed during the warming period by the gas to be cooled, while another similar regenerator during the cooling period is traversed in the opposite direction and cooled by another stream of gas to be warmed. The temperature changes are permitted to occur only inside the regenerators, and the regenerators are reversed before the temperature change within the regenerator reaches the cold end and after the termination of the warming priod, or the warm end after the termination of the cooling period.

The gas which traverses the regenerator during its warming period is generally under elevated pressure while the regenerator in the cooling period is generally traversed by a fractionation or other product under atmospheric pressure from an associated low temperature fractionation or other system.

If the gas to be cooled contains condensable components, such as water vapor, carbon dioxide or hydrocarbons, these will collect on the heat storage masses. If the current of gas to be warmed must leave the system free from impurities it can then be returned through coils inside the regenerators. Alternately, there can be interposed between the warming and cooling periods a special sublimation period in which these condensables are removed by a scavenging gas. The sublimation of the condensable impurities into the scavenging gas is facilitated if the regenerator is kept during the scavenging period at a pressure lower than during the warming period, e.g. under vacuum.

The change over from a period of elevated pressure (e.g. the warming period) to a period of diminished pressure (e.g. the sublimation period), or if the latter is not used, then the cooling period, is usually accomplished by first shutting off the delivery of gas to the input gas regenerator and the extraction of gas from the output gas regenerator, and then by means of a bypass valve equalizing the pressures in the regenerators in the warming period and in the scavenging or cooling period. Each regenerator then passes through the next following period, the residual gas in the regenerator under elevated pressure before pressure equalization being lost.

In a procedure such as the above there is an undesired interruption of the inlet gas and the output gas currents, and in particular a material and energy loss since the input gas which escapes in opposite direction out of the input regenerator when the latter loses its pressure does not participate in the gas fractionation subsequent to the cooling. If, however, no sublimation period is used and a contamination of the pure output gas by the impure input gas is to be avoided, then the current of pure output gas cannot be added to the final product until after the crude input gas in the regenerators has been completely displaced by pure output gas. It may also be necessary to compensate for the energy lost by the operation of the by-pass valve. These losses incidental to the switching of a regenerator from a higher to a lower pressure are materially lessened by using the process and apparatus of the present invention.

The savings effected by the use of the process and apparatus of the present invention result from the interposition between the period of elevated pressure and the period of lower pressure of an additional period in which the high pressure gas remaining in the regenerator at the end of the first period, namely the warming period, is drawn off and reused. If the duration of this additional period is of the same length as the warming or cooling period, then at least one additional regenerator must be provided for this additional period.

In a special form of the present invention this additional regenerator can be dispensed with if the duration of this additional period together with the duration of the subsequent period of diminished pressure is equal in length to the warming period alone.

In previous processes for freeing gases from condensable components, as for example, in the production of crude ethylene fractions from coke oven gas, three regenerators have generally been used which during three successive periods were each in turn first supplied with crude gas, then freed from condensable by a scavenging gas from any convenient source not under pressure and/or vacuum, and finally traversed in countercurrent relation to the crude gas by the now purified gas under pressure.

The basic concept of the present invention is preferably accomplished by removing the gas content of the regenerator in the additional period between the crude gas and the sublimation period from the cold end of the regenerator and then delivering the said gas to the cold end of the regenerator in the sublimation period.

In the apparatus for carrying out the above operation the cold ends of all of the regenerators are each equipped with a conduit containing a regulating valve and a pilot valve and with a conduit containing a check valve, these conduits being joined to a single connecting conduit.

According to another feature of the present process the gas content of the regenerator in the additional period is removed with diminishing pressure over its cold end, warmed in countercurrent with itself, then compressed together with added pure gas to the crude gas pressure, and after being cooled in countercurrent relation to itself mixed with the gas current used for cooling the regenerator during the cooling period. This procedure is especially advantageous if the cooled crude gas, before being rewarmed in the regenerators, is delivered to the rectification system.

The apparatus for carrying out the process is characterized in that the cold ends of all of the regenerators are connected, each by means of a pilot valve and through a heat exchanger and a compressor with the conduit delivering the cooled and purified gas, a branch of said conduit leading to the suction side of the compressor.

According to another modification, the process can also be carried out by removing the gas content of the regenerator in the additional period through the warm end of the regenerator and adding it to the crude gas. If the crude gas is already under pressure, it will then be necessary for the returned gas to be compressed. If, however, the crude gas is not under pressure, the returned gas will then be delivered to the suction side of the compressor. The apparatus used for this procedure is characterized by a conduit leading from the warm end of each regenerator to the crude gas conduit.

It is advantageous for the sublimation of the impurities to introduce cold output gas as scavenging gas into the cold end of the regenerator in the sublimation period.

If the regenerating system is connected to a low temperature fractionation system, as for example, a two-stage rectification column, then according to another form of the invention, the pressure of the gases during the additional period between the warming and the cooling periods is lowered to the pressure of a stage of the associated low temperature fractionation system and the gas content of the regenerator in this additional period is delivered from the cold end of the regenerator to the fractionation system. In this system the gas is advantageously supplied to the low temperature fractionation system through a volume controlled throttle valve.

An air fractionation system with periodically reversible regenerators and a two-stage air separator for operation of the process of this invention is characterized by a conduit leading from the cold end of each regenerator provided with a volume controlled throttle valve and which opens into an intermediate plate in the upper column where the composition approximately corresponds to that of the air.

The process and apparatus of the present invention will now be further illustrated by reference to the attached drawings. It will be understood, however, the variations from the specific examples described will be obvious to one skilled in the art and that such variations which do not depart from the concept of the invention are intended to come within the scope of the appended claims.

FIGURES 1a–1d show schematically various systems for obtaining crude ethylene from crude coke oven gas. Here the higher hydrocarbons down to and including ethylene, together with carbon dioxide, and water vapor, are condensed in the regenerator which is in the warming period. During the additional period which has been interposed between the warming and the scavenging period, the coke oven gas remaining in the regenerator at the end of the preceding period is slowly drawn off for uses elsewhere. The condensed components containing the crude ethylene fraction are drawn off by a vacuum pump in the next following period. In the subsequent cooling period the coke oven gas which has been freed from carbon dioxide, water vapor and ethylene flows in countercurrent relation to the crude gas through the regenerator.

FIGURE 2 shows an air fractionation system in which the air to be cooled and freed from carbon dioxide and water vapor is first delivered to a system of three regenerators, each of which in turn passes successively through the warming period, then through the additional period covered by the present invention, and finally through the cooling period. The air leaving the regenerators is fractionated in a two-stage rectification column. The air drawn off from the cold end of the regenerator during the additional period covered by this invention is delivered to the upper stage of the rectification column. During the cold period a fractionation product, namely nitrogen, which also serves at the same time as a scavenging gas, is passed through the regenerators. Pure oxygen is returned through the coils inside the regenerators.

In the various figures the conduits used during the switching phase shown are shown drawn with heavy lines while the conduits not then in use are drawn with thin lines. The valves in these conduits are shown in the usual manner.

In FIGURE 1a coke oven gas is delivered at 8 atms. pressure by conduit 5 to regenerator 1, in which it is cooled to approximately 125° K. with the result that the carbon dioxide and water vapor and practically all of the ethylene, but as little methane as possible, will be condensed. The purified coke oven gas leaving regenerator 1 through conduit 6 now flows through regenerator 4 in which it is warmed to the temperature of the surrounding air and is then removed by conduit 7 for further fractionation for the recovery of hydrogen, or for other industrial uses.

At the same time the regenerator 3 is in the scavenging period during which the substances condensed from the coke oven gas during the cooling period, namely the higher hydrocarbons including ethylene and also the carbon dioxide and water vapor, are removed through conduit 12 by pump 8 and delivered to the gasometer 9 as crude ethylene.

The vaporizaiton of the condensates during the scavenging period is assisted by a small amount of scavengging gas. The latter is brought by conduit 10 through pilot valve 18a and throttle valve 18 from the cold end of regenerator 2 which is then in the additional period which is the subject of this invention, the gas being then delivered to the cold end of the scavenged regenerator 3 through conduits 20 and 11 and the check valve 19 contained therein, finally arriving together with the vaporized condensates at the gasometer. In the operation of the process as shown in FIGURE 1a the crude gas remaining under pressure in the regenerator 2 from the preceding warming period is used as the scavenging gas. The cold losses of the process are compensated by the vaporization of methane in the coils 21.

Figure 1D:
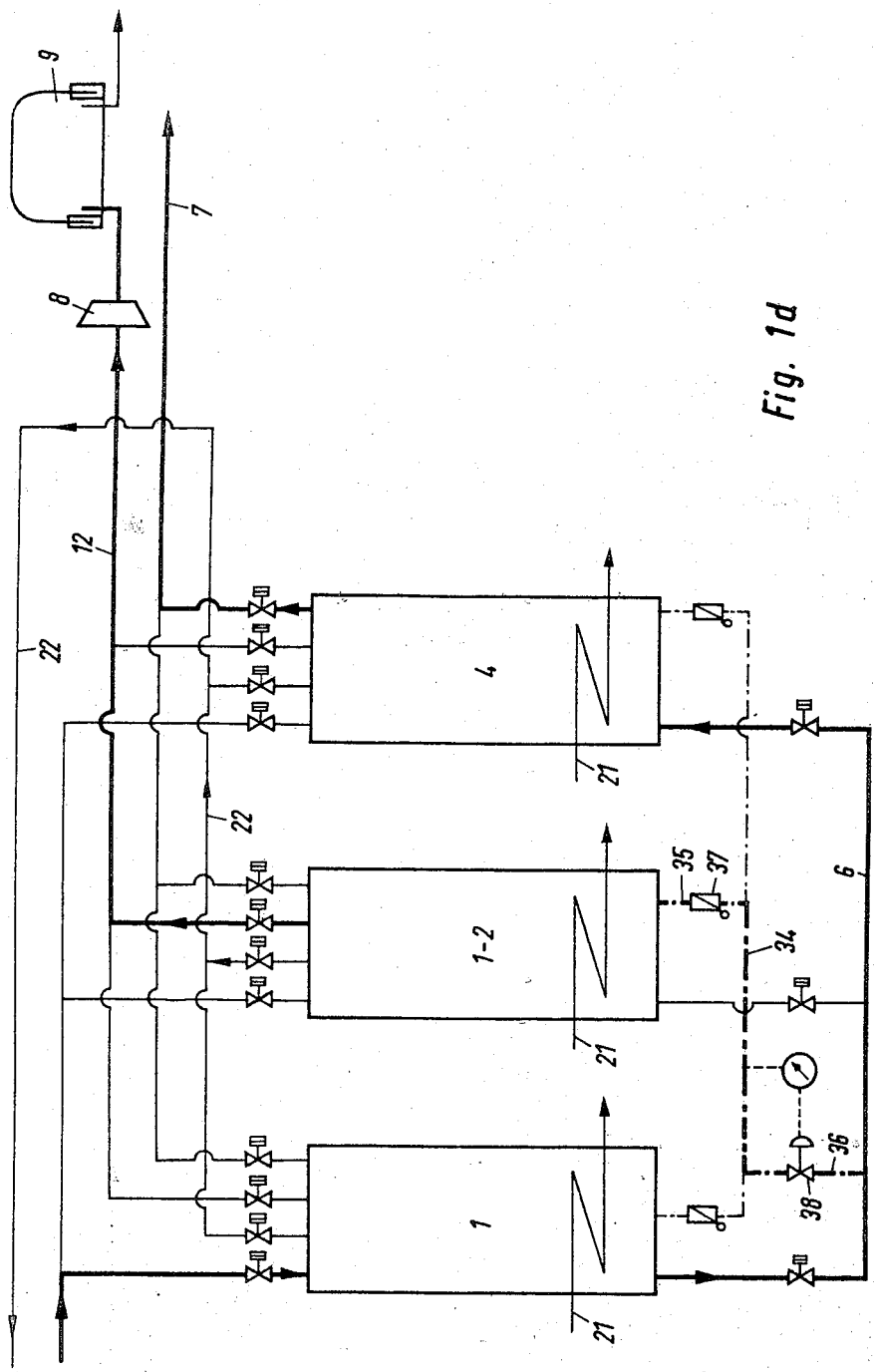

The operations shown in FIGURE 1b, 1c and 1d differ from that of FIGURE 1a described above only in that use is made of the gas produced during the additional period provided by the present invention. In all of these figures corresponding parts are designated by the same reference characters. The condensed impurities can be removed from the regenerator during the scavenging or sublimation period either by vacuum alone or by additional flushing with pure gas. In the latter case use is made of the dot and dash conduits and the valves associated therewith.

In FIGURE 1b the gas remaining in the additional regenerator 2 after the end of the preceding warming period is drawn off over the cold end through the pilot valve and conduit 13, warmed in the heat exchanger 14, compressed in the compressor 16, together with a small amount of pure gas added by conduit 15 to maintain heat equilibrium, the gaseous mixture then cooled in the same heat exchanger in countercurrent relation to itself, and then delivered by conduit 17 to the regenerator 4 together with a current of pure gas from the regenerator 1 in the warming period. In this manner the amount of pure gas is increased by the amount of gas remaining in the regenerator after the warming period.

If the amount of gas to be used during the additional period covered by the present invention is not taken from the cold end of the regenerator 2 but as in FIGURE 1c from the warm end of the latter by means of conduit 22, then a certain portion of the condensed components will be vaporized. This gaseous portion is then brought by compressor 23 to the pressure of the crude gas and returned to the latter.

In FIGURE 1d is illustrated a process in which the additional period and the scavenging period are combined so that instead of four, only three regenerators are necessary. Here crude gas is delivered at a pressure of 8 atms. by conduit 5 to regenerator 1 in the warming period and from which it is delivered by conduit 6 to regenerator 4 still in the cooling preiod, and from which it is then delivered by conduit 7 as pure gas. The duration of the warming and the cooling periods is 6 minutes for each. In the meantime the regenerator 2–3 first passes through the additional period during which the gas in it is drawn off by conduit 22 and delivered to the suction side of the crude gas compressor. After half a minute the regenerator 2–3 is switched over to be evacuated for 5.5 minutes by pump 8.

If the sublimation of the impurities is to be assisted by a current of scavenging gas, it will then be necessary to provide also the conduits 34, 35 and 36, a check valve 37 in each conduit 35 and a pressure controlled valve 38. As soon as the regenerator 3 which is being evacuated by the pump 8 is under a sufficiently high vaccum the pressure regulated valve 38 will open to permit some pure gas to pass through check valve 37 into regenerator 3.

In FIGURE 2 the air to be fractionated is delivered at 5.8 atms. pressure by conduit 1 to regenerator 2 in which it is cooled to −173° C. (during the warming period of the regenerator) and then delivered by conduit 3 to the pressure column 4 of the two-stage rectifier, the pressure column operating under 5.6 atms. pressure At the same time the regenerator 5 passes through the additional period of the present invention during which the compressed air remaining in this regenerator at the end of the preceding warming period is delivered through volumn controlled throttle valve 7 and conduit 6 to inlet 8 of the upper column 9 of the two-stage rectifier whose upper column is operating at a pressure of 1.3 atms. The volumn control by which independently of the pressure in regenerator 5, a constant amount of gas will always be delivered to the upper column 9, prevents pressure fluctautions which would interfere with the rectification process. The valve 7, therefore, is adjusted in such a manner that the emptying of regenerator 5, namely the reduction of the pressure from 5.8 atms. down to the pressure of the upper column, will be almost completed during one switching period.

The compressed air which remains in the regenerator at the end of the warming period, and which had heretofore gone to waste, is now made available for the production of oxygen and nitrogen. Furthermore, an interruption of the air and nitrogen currents, which was unavoidable, is now unnecessary.

At the same time regenerator 10 is passing through the cooling period by being traversed by a fractionation product delivered to it by conduit 12 and from it by conduit 13, e.g. nitrogen taken from column 9, which takes up the condensed impurities, becomes warmed to the temperature of the surroundings and thereby lowers the temperature of the regenerator sufficiently so that in the next period it can again serve to cool the air.

It can be advantageous to connect the warm ends of the individual regenerators with one another by bridging conduits 33 which serve to equalize the pressure between the regenerators which have just passed through their cooling and warming periods. The air remaining in the regenerator after the warming period is then, as previously noted, delivered through valve 7 into the upper column during the additional period contemplated by this invention.

For completeness the remaining parts of the fractionation system will be described, although they do not constitute a part of the present invention. From the middle of the regenerator 2 which is now in its warming period, air is removed through an outlet 14 and delivered through an adsorber 15 to an expansion turbine 16 and then is expanded into the upper column 9.

The air which is fed into the pressure column 4 by conduit 3 in which it is fractionated into pure nitrogen and an oxygen-rich liquid which is expanded through conduit 20 into column 9. Pure liquid nitrogen is conveyed by conduit 24 from the head of column 4 and delivered to the head of column 9 as a washing liquid. The gaseous nitrogen which leaves this column at 11 passes through the heat exchanger 27 and then through conduit 12 to regenerator 10. The gaseous oxygen is continuously removed via conduit 32 and passes through the coils 31 in the regenerators so as not to become contaminated by the impurities which have been condensed in the regenerators.

The advantages of the above-described invention are clearly evident from the fact that by its use it is no longer necessary to interrupt the participating gas currents while the system is switched from a period of elevated pressure to a period of diminished pressure and that the compressed gas remaining in the regenerator after the period is no longer lost. The material and energy losses which occurred during switching operations are reduced by the procedure of the present invention in proportion to the completeness with which the added regenerator constituting the present invention is emptied.

What is claimed is:

1. In a low temperature heat exchange process conducted in periodically reversible regenerators, said process comprising warming a regenerator in a first period under an elevated pressure, subliming impurities in the regenerator in a next period under a lower pressure than said elevated pressure, and cooling said regenerator in a further period with cold gas under a lower pressure than said elevated pressure, the improvement comprising closing one end of the regenerator after said regenerator has just passed through the warming period, and withdrawing from the other end of said regenerator, gas under elevated pressure remaining in said regenerator, said withdrawing being done in an additional period intermediate the warming and subliming periods, and reusing withdrawn gas in the process.

2. The process of claim 1 wherein the gas content of the said additional period is withdrawn from the cold end of said regenerator and delivered to the cold end of a regenerator in the next succeeding low pressure sublimation period, said process comprising a separate regenerator for each period and a vacuum pump connected to the outlet side of the regenerator in the sublimation period.

3. The process of claim 1, wherein the gas content of the regenerator constituting the said additional period is removed through its cold end, warmed in countercurrent relation to itself, compressed in admixture with added pure gas to the pressure of the entering crude gas, and after being cooled in countercurrent with itself is mixed with the gas current used for cooling the regenerator during the cold period.

4. The process of claim 1, wherein the gas content of the regenerator constituting said additional period is withdrawn through its warm end and is delivered to the crude inlet gas.

5. The process of claim 1, wherein the combined duration of the said additional period and the next succeeding period of diminished pressure is equal to the duration of the warming period.

6. The process of claim 1, wherein the gas content of the regenerator constituting said additional period is withdrawn through its warm end and is delivered to the crude inlet gas, and the combined duration of the said additional period and the next succeeding period of diminished pressure is equal to the duration of the warming period.

7. The process of claim 1, wherein the gas content of the regenerator constituting said additional period is removed through its cold end, warmed in countercurrent relation to itself, compressed in admixture with added pure gas to the pressure of the entering crude gas, and after being cooled in countercurrent with itself is mixed with the gas current used for cooling the regenerator during the cold period, and in which cold pure gas is delivered as a scavenging gas to the cold end of the regenerator in the sublimation period.

8. The process of claim 1, wherein the gas content of the regenerator constituting said additional period is withdrawn through its warm end and is delivered to the crude inlet gas, and in which cold pure gas is delivered as a scavenging gas to the cold end of the regenerator in the sublimation period.

9. The process of claim 1, wherein the combined duration of the said additional period and the next succeeding period of diminished pressure is equal to the duration of the warming period, and in which cold pure gas is delivered as a scavenging gas to the cold end of the regenerator in the sublimation period.

10. The process of claim 1, wherein the pressure of the gas during the said additional period is lowered to the pressure of a stage in an associated low temperature fractionation system and where said gas is delivered from the cold end of the regenerator of said additional period to said stage.

11. The process of claim 1, wherein the pressure of the gas during the said additional period is lowered to the pressure of a stage in an associated low temperature fractionation system and where said gas is delivered from the cold end of the regenerator to said stage, and where said gas is delivered to the fractionation system through a volume controlled throttle valve.

References Cited

UNITED STATES PATENTS

| | | | |
|---|---|---|---|
| 1,974,065 | 9/1934 | Frankl | 62—13 |
| 2,107,335 | 2/1938 | Linde et al. | 62—13 X |
| 3,073,128 | 1/1963 | Becker. | |
| 3,074,245 | 1/1963 | Becker | 62—13 X |
| 3,091,093 | 5/1963 | Becker | 62—12 |
| 3,105,360 | 10/1963 | Lehmer et al. | 62—13 |
| 3,214,925 | 11/1965 | Becker | 62—13 |
| 3,216,206 | 11/1965 | Kessler | 62—13 |
| 2,825,212 | 3/1958 | Linde. | |
| 2,981,082 | 4/1961 | Sixsmith. | |

NORMAN YUDKOFF, *Primary Examiner.*

V. W. PRETKA, *Assistant Examiner.*